Patented July 30, 1940

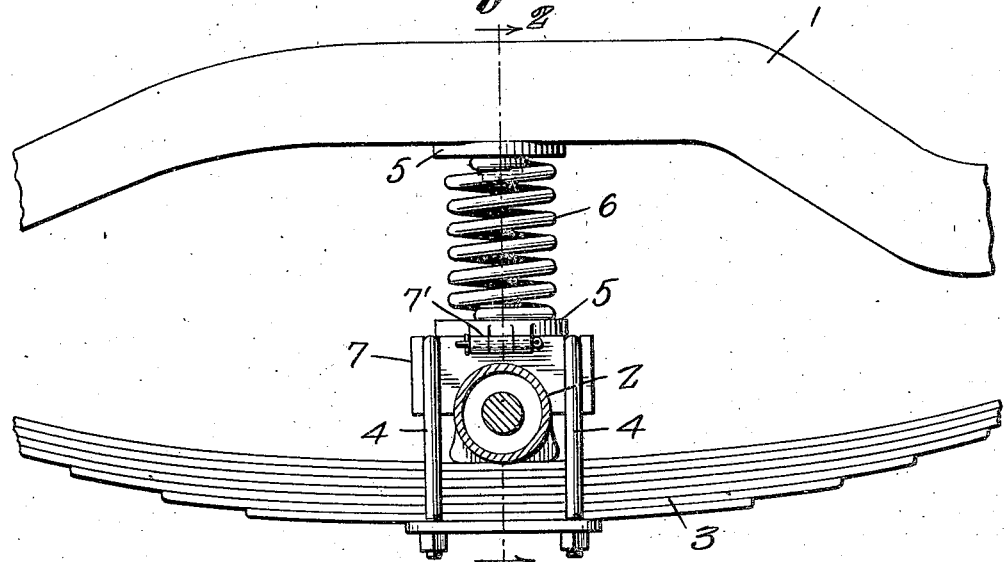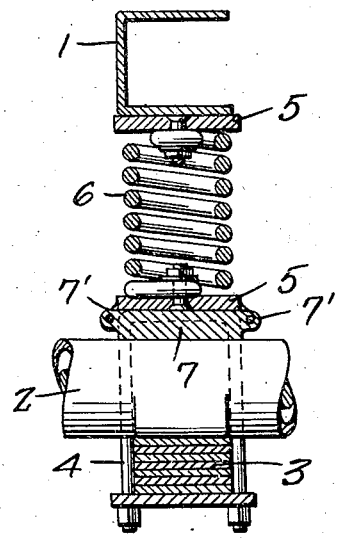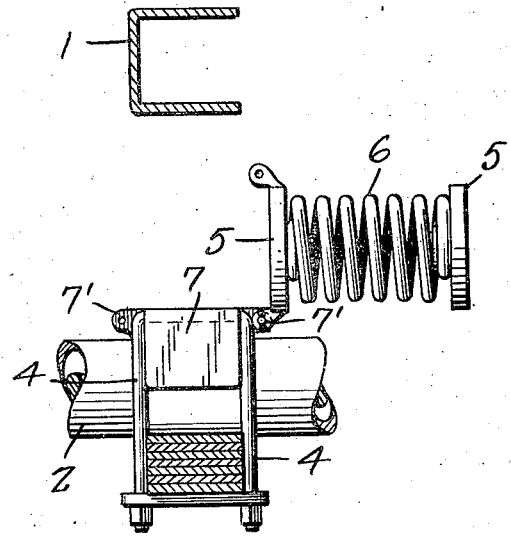

2,209,632

UNITED STATES PATENT OFFICE 2,209,632

RELEASING OVERLOAD SPRING

Jack Martin, Weatherford, Tex.

Application February 16, 1938, Serial No. 190,852

2 Claims. (Cl. 267—28)

This invention relates to auxiliary springs for trucks and similar vehicles and has for the primary object the provision of auxiliary load sustaining springs and mountings therefor which may be readily adapted to truck axles by the usual truck spring securing means on the axles and may be easily brought into position to engage the truck frame to aid the truck springs in sustaining a load and which permits much heavier loads to be carried by the truck without danger of damaging the truck springs, the mountings permitting the auxiliary springs to be brought into inoperative position when normal loads are placed on the truck or when the latter is unloaded so that the normal riding qualities of the truck springs will not be affected.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation, partly in section, showing a portion of a truck chassis, an axle housing and truck spring with my invention adapted thereto.

Figure 2 is a sectional view taken on line 2—2 of Figure 1.

Figure 3 is a fragmentary sectional view showing the invention in an inoperative position.

Referring in detail to the drawing, the numeral 1 indicates a portion of the truck frame, 2 an axle housing and 3 the truck spring mounted on the axle housing in an under-slung fashion by U-clamps 4.

The present invention consists of spring heads 5 having the ends of a coil spring 6 secured thereto. One of the heads 5 is hinged on a block 7 recessed to receive a portion of the axle housing and also grooved to receive the U-clamps 4 and cooperate therewith in fastening the truck spring 3 on the axle housing. A pair of hinges 7' are employed for connecting the last-named head on the block and each includes a removable pintle whereby the latter-named head may be freed for hinging movement in either direction with respect to said block to permit positioning of the device in an inoperative position. When the truck is unloaded the spring 6 may be positioned vertically with one of the heads 5 resting on the block 7 and the other head contacting the frame of the truck. The spring 6 in this position will cooperate with the spring 3 in sustaining heavy loads placed on the truck. Whenever the truck is operated with light loads or in an unloaded condition the spring 6 may be swung to overlie the axle housing as suggested in Figure 3, permitting the spring 3 to function normally in cushioning shocks and the like and thereby provide normal riding qualities for the truck. It is to be understood that each spring 3 of the truck has in conjunction therewith the spring 6 of the present invention. Through the use of the present invention on trucks much heavier loads may be carried without damage to the truck springs and other parts.

What is claimed is:

1. In combination with a truck frame, an axle housing and a truck spring including U-clamps, a block engaging the axle and engaged by the U-clamps for the mounting of the truck spring on the axle housing, a spring head hinged on said block to be positioned to rest on said block or to be positioned angularly thereto, a coil spring secured to said head, and a second head secured to the coil spring to engage with the truck frame when the first-named head rests upon the block to cooperate with the truck spring in sustaining the load on the truck frame.

2. In combination with a vehicle frame, an axle and a vehicle spring, a block secured to the axle housing, and a spring interposed between said block and said vehicle frame and with one end thereof hingedly attached to said block the other end of the spring being unattached and adapted to be manually pivoted into or out of engagement with the said frame.

JACK MARTIN.